Dec. 19, 1944.  L. E. BOGUE  2,365,520
FASTENING DEVICE
Filed Nov. 29, 1941
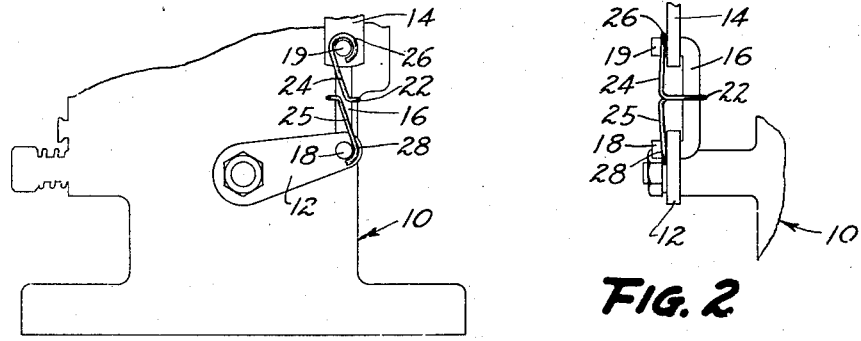
FIG. 1
FIG. 2
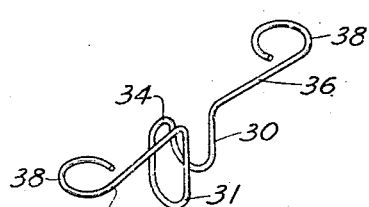
FIG. 4
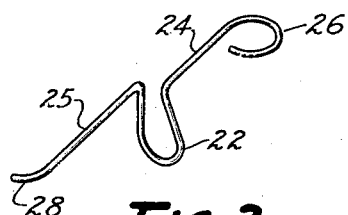
FIG. 3
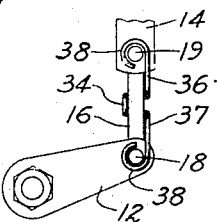
FIG. 5
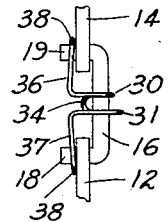
FIG. 6
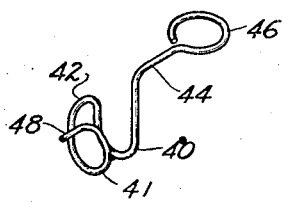
FIG. 7
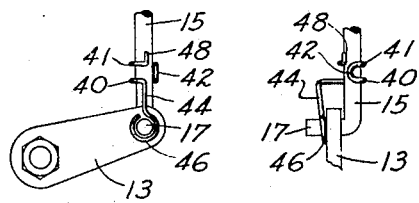
FIG. 8    FIG. 9
INVENTOR
LEONARD E. BOGUE
BY
A. R. McCrady
ATTORNEY Patented Dec. 19, 1944

2,365,520

UNITED STATES PATENT OFFICE 2,365,520

FASTENING DEVICE

Leonard E. Bogue, South Bend, Ind., assignor to Bendix Aviation Corporation, South Bend, Ind., a corporation of Delaware Application November 29, 1941, Serial No. 420,990

14 Claims. (Cl. 287—94)

This invention relates generally to fastening devices and particularly to devices or clips for securing together the parts of mechanical linkages.

The levers of many mechanical devices are operably connected with other parts by links or rods, usually having laterally turned end portions forming pivotal connections with the levers. Such rods and levers are commonly secured together by cotter pins or snap-on clips of the hairpin type. However, when cotter pins are used it is necessary to drill holes through the rod ends to receive the cotter pin, and when hairpin clips are used, grooves must be provided adjacent the ends of the rods. Drilling the holes or forming the grooves in the ends of the rods adds to the cost of manufacturing same and it is highly desirable to eliminate these operations. Further disadvantages of the above mentioned fasteners are that they are easily lost and that they permit undesirable vibration of the connected parts which in turn causes excess wear of same.

With the foregoing in view it is an important object of the present invention to provide a clip for securing together rods and levers of this character that will overcome said disadvantages.

Another object of the invention is to provide a device of this character including convenient means whereby same may be engaged with a tool for removal of the device.

A further object of the invention is to provide a device of this character that will not readily become displaced on the rod or link.

Still other objects of the invention are to provide a device of this character that is simple in construction, that lends itself to inexpensive manufacture in large volume by automatic machinery and that is easy to attach.

Further objects and advantages of the invention will become apparent from the following description taken in connection with the accompanying drawing, in which:

Figure 1 is a partial elevation of a carburetor having two levers with a link or rod connecting same, said rod being secured from detachment from the levers by a preferred embodiment of the present invention;

Figure 2 is a view of said rod and lever assembly operably secured together with said invention and taken at right angles to the view shown in Figure 1;

Figure 3 is an enlarged isometric view of the device per se;

Figure 4 is an isometric view of a modified embodiment of the device;

Figure 5 is a side view of two levers and a connecting rod, the parts being secured together with the device shown in Figure 4;

Figure 6 is a view of same taken at right angles to the view shown in Figure 5;

Figure 7 is an isometric view of a further modification of the invention;

Figure 8 is a side view of a rod and lever secured together by the device shown in Figure 7; and Figure 9 is a view of same taken at right angles to the view shown in Figure 8.

While several preferred embodiments of the invention are shown in the accompanying drawing and herein described in detail, it is to be understood that this disclosure is given solely for the purpose of illustrating the invention and is not intended as a limitation thereof to the constructions disclosed, the appended claims being intended to cover all modifications and alternative constructions falling within the scope of the invention.

The invention may be used to secure together various types of levers and links or rods although it is herein shown as a fastener to secure together levers and rods of a carburetor. With reference to Figures 1 to 3, numeral 10 (Figures 1 and 2) indicates a carburetor generally which has a throttle lever 12 operably connected with a lever 14 by a rod or link 16, the ends of the rod 16 being turned to provide laterally extending portions 18 and 19 received in holes adjacent the free ends of the respective levers 12 and 14.

The fastener shown in Figures 1 to 3 preferably comprises a length of wire which may be resilient and which includes an intermediate U-shaped or loop portion 22, the open ends of which are preferably inclined toward each other to thereby more firmly grip the rod when attached thereto. From the member 22, longitudinal arms 24 and 25 extend oppositely of each other and laterally of the plane of said U-shaped portion 22. One of the arms, shown as arm 24, is provided with an eye 26 and the other arm, 25, is shown as having a slightly bent portion 28 adjacent its free end although if desired said arm may be straight. Preferably the curved portion 28, or the arm 25 if the end thereof is not curved, bears with some tension against the end portion 18 of rod 16, thereby more securely retaining the fastener in place. Further it is to be understood that the arm 25 may be disposed on the opposite side of portion 18 from that shown in Figures 1 to 3, the curve of end 28 then being the reverse from that shown in said figures.

The U-shaped portion 22 is adapted to be clipped to the rod 16 and when thus attached the arms 24 and 25 extend longitudinally of the rod, and said arms are so arranged that their ends resiliently react between the loop or U-shaped portion 22 and the sides of the respective levers 14 and 12 opposite the rod. Thus the rod and levers are urged together with sufficient force to normally prevent vibration of the parts. The portions 18 and 19 of the rod are long enough to project through the levers 12 and 14 and beyond the adjacent sides thereof, and to prevent longitudinal or rotational displacement of the fastener on the rod. The projecting end of the laterally turned portion 19 is received in the eye 26, the axis of which intersects the axis of rod 16.

The modified embodiment of the invention shown in Figures 4, 5 and 6 comprises a pair of U-shaped portions 30 and 31 in spaced substantially parallel planes. Corresponding parts of the U-shaped portions 30 and 31 are connected together at 34, the other parts being provided respectively with arms 36 and 37 each of which is provided with an eye 38 adjacent its free end. The arms 36 and 37 extend oppositely of each other and laterally relative to the planes of the U-shaped members 30 and 31.

The fastener is attached as shown in Figures 5 and 6, with the U-shaped portions 30 and 31 looped about the rod 16 and the eyes 38 of the arms 36 and 37 receiving the respective projecting ends of the laterally turned portions 19 and 18 of said rod which is pressed against the adjacent sides of levers 12 and 14 in a manner similar to that effected by the first described embodiment of the invention.

It should be noted that if desired one of the U-shaped portions 31, may be longer than the other so that same may be readily grasped by a pliers or the like to aid in removal of the fastener from the rod, or such removal may be effected by inserting a small instrument, with or without a hook, in the closed end of said U-shaped member and pulling or prying the central U-shaped portion of the fastener from the rod, after which the entire fastener may be moved in the opposite direction to disengage the eye portions of the fastener.

The embodiment shown in Figures 7, 8 and 9 is adapted for use in securing together a single lever and rod, 13 and 15 respectively. This embodiment of the device includes a pair of U-shaped members 40 and 41 in spaced substantially parallel planes. Corresponding arm portions of the U-shaped members are connected at 42, the other arm portion of U-shaped member 40 having a laterally extending arm 44 terminating in an eye 46, the corresponding arm portion of the U-shaped member 41 having a short lateral extension 48.

The U-shaped members are clipped to the rod 15 with the arm 44 extending over the adjacent end of lever 13. Rod 15 has a laterally turned end portion 17 extending through a hole in the free end of lever 13 and is received in the eye 46 of the fastener to prevent displacement of the device.

The U-shaped members 40 and 41 are clipped on to the rod 15 to inhibit tilting thereon and the extension 48 of the fastener lies longitudinally on rod 15 to aid in stabilizing the device on said rod. Preferably the arm portion of the U-shaped member 40 carrying arm 44 extends beyond the plane of the outer side of the lever, as shown in Figure 9, and said arm 44 is inclined therefrom toward the axis of the rod 15 so that the free end of said arm, with its eye 46, resiliently bears against the adjacent side of the lever 13. Thus the lever and rod are firmly but operably held against each other in a manner that prevents vibration thereof.

It should be understood that while the invention is shown as being formed of wire it may also be formed of other suitable strip material and it will be apparent to those skilled in the art that while three modifications of the invention are illustrated and described herein other changes and modifications may be made in the structures described without departing from the spirit and scope of the invention.

I claim:

1. In combination, a rod having laterally turned end portions, a lever pivoted on each end portion, and a fastening device, said device including an intermediate portion clipped onto the rod and adapted to frictionally engage the rod, and arms extending longitudinally of the rod, the ends of the arms being positioned adjacent the sides of the respective levers opposite the rod.

2. The invention defined in claim 1 wherein the laterally turned end portions of the rod project beyond the respective levers pivoted thereon, and at least one of the arms of the fastening device being provided with an eye adjacent the free end thereof, said eye receiving therein the respective projecting end portion of the rod.

3. The combination of a pair of levers, a link connecting said levers, and a fastener adapted to be clipped onto the link, said fastener having arms adapted to engage the respective levers and prevent the rod from becoming disconnected from same.

4. The combination of a link having longitudinally spaced laterally turned portions, said portions being substantially parallel, a lever pivoted on each laterally turned portion, and a fastening device having an intermediate portion about the link, arms extending from said intermediate portion and engaging the respective levers whereby the link and levers are urged together, and means for holding the device against displacement on the link.

5. The combination of a rod having a laterally turned end portion, a lever pivoted on said portion, and a fastening device formed of a length of wire and having a plurality of spaced loops in substantially parallel planes, said loops being adapted to receive the rod therein, and a resilient arm extending transversely with respect to the planes of the loops and adapted to engage one side of the lever whereby the rod and lever are urged into contact with each other.

6. The combination of a rod having laterally turned portions spaced apart, levers pivoted on the respective rod portions, the free ends of the laterally turned portions extending beyond the adjacent sides of said levers, and a fastening device formed of a length of resilient wire and having oppositely disposed members extending lengthwise of the rod, an intermediate section connecting the oppositely disposed members and looped about the rod, and an eye adjacent the free end of one of the oppositely disposed members received on the projecting end of the respective laterally turned portion of the rod, the other said member having a curved portion adjacent its free end, said fastening device being adapted to urge the rod and levers together.

7. A fastener for rod and lever assemblies, comprising a length of resilient wire formed into a plurality of intermediate spaced U-shaped members having substantially a common axis, oppositely extending longitudinal arms, and eyes adjacent the free ends of said arms, the planes of the eyes being at an angle to the planes of the U-shaped members.

8. In combination, a rod having laterally extending end portions, a lever pivoted to each said portion, and a fastener comprising a length of resilient wire having longitudinally extending parts engaging said levers, and a pair of U-shaped sections intermediate the free ends of the longitudinally extending parts, said U-shaped sections being looped about the rod, the closed end of one of the U-shaped sections engaging the rod, the other U-shaped section being longer than said one section and having its closed end spaced from said rod.

9. In combination, a rod having laterally turned end portions, a lever pivoted to each of said portions, and a fastening device formed of a length of wire, said device including a pair of U-shaped sections receiving the rod therein, oppositely disposed parts extending longitudinally of the rod and engaged with the respective levers whereby the rod is urged against said levers, and means preventing longitudinal and rotational displacement of the fastening device on the rod.

10. In combination, a rod having a laterally turned portion, a lever pivoted thereon, and a fastening clip formed of a length of wire and including a pair of loop-shaped sections spaced apart with respect to the length of the clip and receiving the rod therein, a resilient arm engaging the lever, said clip being adapted to urge the rod and lever together, and an oppositely disposed arm adapted to extend longitudinally along the rod in contact therewith.

11. In a fastening device formed of a length of resilient wire, a plurality of spaced open loops having substantially a common axis, an arm extending longitudinally of said axis and having its free end inclined toward said axis, and an eye adjacent the free end of said arm, the axis of the eye intersecting the axis of said loops.

12. The combination of a rod having laterally turned portions, levers pivoted on the respective laterally turned portions, the free ends of said portions projecting beyond the sides of said levers opposite the rod, and a fastening device formed of a length of resilient wire having oppositely disposed sections extending longitudinally of the rod, an intermediate section connecting the adjacent ends of the oppositely disposed sections and engaging the rod, the other ends of said oppositely disposed sections being free relative to the connected ends, and a portion adjacent the free end of one of the oppositely disposed sections turned on the projecting end of the respective laterally turned portion of the rod, and a part of the other of said oppositely disposed sections bearing laterally against the adjacent laterally turned portion of the rod.

13. The combination of a rod having laterally turned portions, levers pivoted on the respective laterally turned portions, the free ends of said portions projecting through and beyond said levers, and a fastening device formed of a length of resilient wire having oppositely disposed sections extending longitudinally of the rod, an intermediate section connecting the adjacent ends of the oppositely disposed sections and engaging the rod, the other ends of said oppositely disposed sections being free relative to the connected ends, and means anchoring the free end of one of the oppositely disposed sections to the projecting end of the respective laterally turned portion of the rod, the free end of the other of said sections being adjacent the lever on the other laterally turned end portion.

14. In a fastening device formed of a length of resilient wire, a loop portion having an axis, arms extending oppositely of the plane of the loop portion and longitudinally of said axis, a loop adjacent the free end of one of said oppositely disposed arms of approximately the same size as the first mentioned loop, the second mentioned loop having an axis intersecting the axis of the first mentioned loop, and a bent portion adjacent the end of the other of said arms.

LEONARD E. BOGUE.